(12) United States Patent
Kihara et al.

(10) Patent No.: US 11,099,596 B2
(45) Date of Patent: Aug. 24, 2021

(54) PEDAL DEVICE

(71) Applicant: DENSO CORPORATION, Kariya (JP)

(72) Inventors: Noriyasu Kihara, Kariya (JP);
Haruhiko Suzuki, Kariya (JP);
Takehiro Saito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/863,101

(22) Filed: Apr. 30, 2020

(65) Prior Publication Data

US 2020/0257329 A1   Aug. 13, 2020

Related U.S. Application Data

(63) Continuation of application No. PCT/JP2018/038978, filed on Oct. 19, 2018.

(30) Foreign Application Priority Data

Nov. 2, 2017   (JP) .............................. JP2017-212612

(51) Int. Cl.
| | | |
|---|---|---|
| G05G 1/30 | (2008.04) | |
| G05G 5/06 | (2006.01) | |
| B60K 26/02 | (2006.01) | |
| B60T 7/04 | (2006.01) | |
| G05G 5/12 | (2006.01) | |
| G05G 1/40 | (2008.04) | |
| B60T 7/06 | (2006.01) | |
| F02D 33/00 | (2006.01) | |
| G05D 1/00 | (2006.01) | |

(52) U.S. Cl.
CPC ............... G05G 5/12 (2013.01); B60K 26/02 (2013.01); B60T 7/06 (2013.01); G05G 1/40 (2013.01); *B60K 2026/026* (2013.01); *B60T 7/045* (2013.01); *F02D 33/006* (2013.01); *G05D 1/0061* (2013.01); *G05G 1/30* (2013.01)

(58) Field of Classification Search
CPC ............ G05G 1/30; G05G 1/40; G05G 1/445; G05G 1/60; G05G 5/06; G05G 5/12; G05G 5/28; B60K 23/02; B60K 26/02; B60K 2026/023; B60K 2026/026; B60T 7/042; B60T 7/045; B60T 7/06; F02D 28/00; F02D 33/006; G05D 1/0061
See application file for complete search history.

(56) References Cited

U.S. PATENT DOCUMENTS

| | | | |
|---|---|---|---|
| 10,739,809 B2* | 8/2020 | Wojciechowski | ..... B60K 26/02 |
| 2002/0161487 A1* | 10/2002 | Kojima | ..... G05G 1/30 |
| | | | 701/1 |
| 2019/0350757 A1* | 11/2019 | Charles | ..... A61B 5/03 |
| 2020/0317167 A1* | 10/2020 | Ghaffari | ..... B60T 7/06 |

FOREIGN PATENT DOCUMENTS

| | | |
|---|---|---|
| JP | 2000-54860 | 2/2000 |
| JP | 2017-94855 | 6/2017 |

* cited by examiner

*Primary Examiner* — Adam D Rogers
(74) *Attorney, Agent, or Firm* — Nixon & Vanderhye P.C.

(57) ABSTRACT

A pedal device includes a base disposed on an inner wall surface of a vehicle body, a pedal pad movable relative to the base, and a pad fixation portion configured to fix the pedal pad to be immovable relative to the base.

10 Claims, 11 Drawing Sheets

PEDAL DEVICE

CROSS REFERENCE TO RELATED APPLICATION

The present application is a continuation application of International Patent Application No. PCT/JP2018/038978 filed on Oct. 19, 2018, which designated the U.S. and claims the benefit of priority from Japanese Patent Application No. 2017-212612 filed on Nov. 2, 2017. The entire disclosures of all of the above applications are incorporated herein by reference.

TECHNICAL FIELD

The present disclosure relates to a pedal device.

BACKGROUND

Conventionally, a pedal device is mounted on a vehicle and controls a driving state of the vehicle in accordance with the force that the driver depresses the pedal by foot.

SUMMARY

A pedal device of the present disclosure includes a base portion, a pedal pad, and a pad fixation portion. The pedal pad is configured to be movable relative to the base portion. The pad fixation portion is configured to fix the pedal pad so as to be immovable relative to the base portion.

BRIEF DESCRIPTION OF THE DRAWINGS

The above and other objects, features and advantages of the present disclosure will become more apparent from the following detailed description made with reference to the accompanying drawings.

EMBODIMENTS

Comparative Example

When the driver does not need to operate the pedal device during the autonomous driving, it may be desirable to provide a place for resting the foot. For example, a floor lifting device of a comparative example of the present disclosure is configured to move up and down in accordance with the driving mode of the vehicle, and the floor lifting device includes a floor on which the driver can rest feet.

According to the floor lifting device of the comparative example, the floor on which the driver can rest feet is lifted during the autonomous driving mode in which the driver does not need to operate the pedal device. However, when the driving mode is switched from the autonomous driving mode to another driving mode (hereinafter, referred to as non-autonomous driving mode) in which the driver needs to operate the pedal device, the driver needs to wait while the floor moves down. In addition, each time the driving mode is switched between the autonomous driving mode and the non-autonomous driving mode, it is necessary to move the foot, and accordingly the burden on the driver may increase.

Hereinafter, multiple embodiments will be described with reference to the drawings. In the following embodiments, substantially identical portions will be indicated by the same reference signs and will not be described redundantly.

First Embodiment

Figure 1:
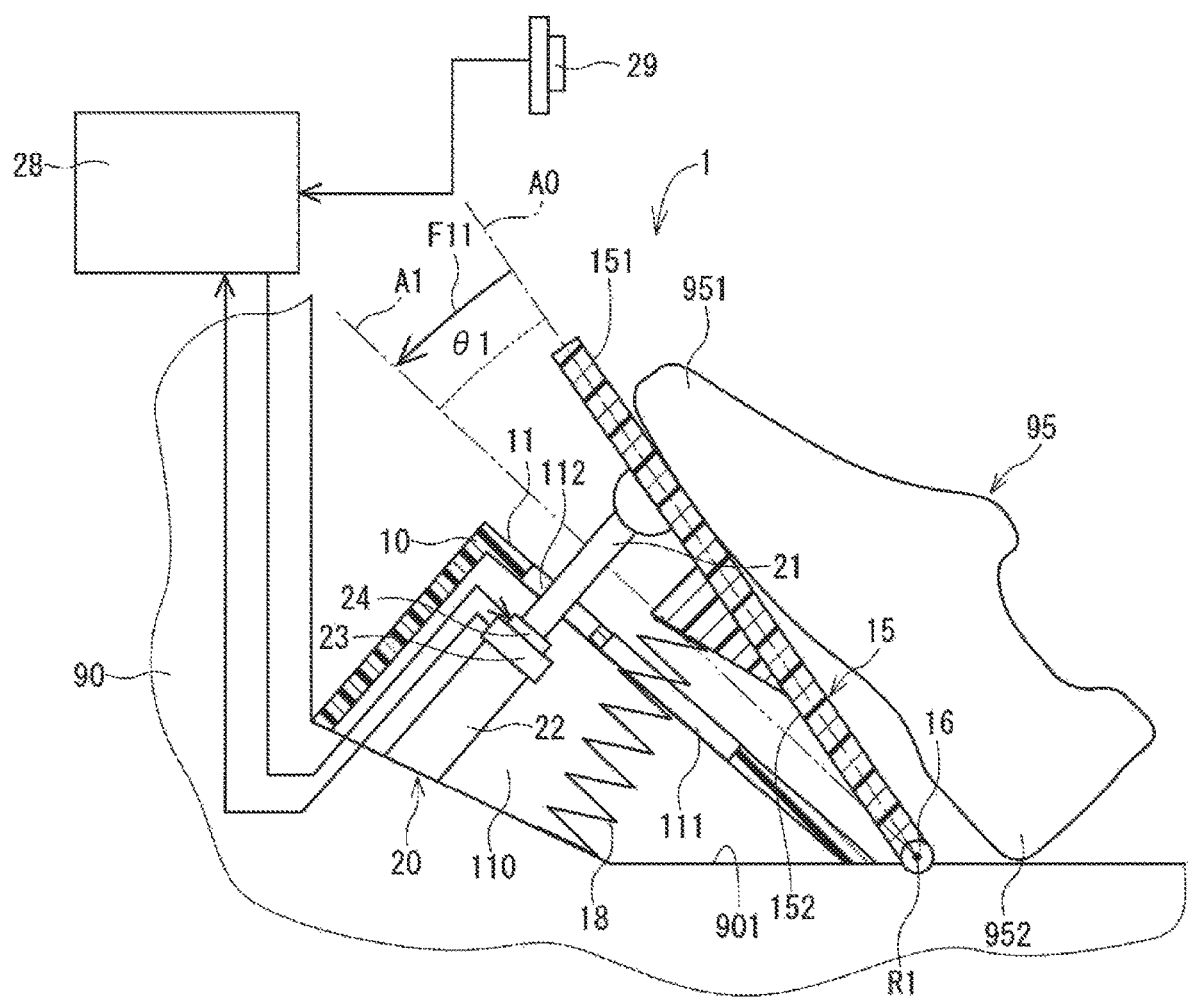
FIG. 1 is a schematic diagram illustrating a pedal device according to at least one embodiment.

A pedal device according to a first embodiment is shown in FIG. 1. An accelerator device 1 as the "pedal device" is an input device operated by a driver as an "operator" of a vehicle for determining an opening degree of a throttle valve of a vehicle engine (not shown). The accelerator device 1 is an electronic device, and outputs a signal indicative of a depression amount as an "operation amount" of the pedal pad 15. In the vehicle on which the accelerator device 1 is mounted, a throttle valve of the vehicle is controlled based on the signal output from the accelerator device 1 and other information.

The accelerator device 1 includes a base portion 10, a pedal pad 15, a spring 18, a pad fixation portion 20, and an engine control unit (hereinafter, referred to as "ECU") 28. The accelerator device 1 is located where the driver can step on with a foot 95 in a passenger compartment (not shown) of the vehicle on which the accelerator device 1 is mounted. A driver's toe is represented by a reference numeral 951, and a driver's heel is represented by a reference numeral 952. The accelerator device 1 is supported by a vehicle body 90 as shown in FIG. 1.

The base portion 10 is fixed to an inner wall surface 901 of the vehicle body 90 so as not to move relative to the vehicle body 90. The base portion 10 is a box-shaped member, and defines therein a space 110 in which the spring 18 and a part of the pad fixation portion 20 can be housed. An end surface 11 facing the inner wall surface 901 of the base portion 10 is inclined with respect to the inner wall surface 901 to extend along the pedal pad 15 when the pedal pad 15 is pressed.

The pedal pad 15 has a substantially flat shape. An end surface 151 of the pedal pad 15 that is an opposite side of a side facing the base portion 10 is formed such that the driver can place the foot 95 on the end surface 151. The pedal pad 15 is movable relative to the base portion 10 when the driver presses the pedal pad 15. The pedal pad 15 has a rotatable support portion 16 at an end close to the heel 952. The rotatable support portion 16 rotatably supports the pedal pad 15. The rotatable support portion 16 is disposed on the inner wall surface 901. Accordingly, the pedal pad 15 is supported rotatably about a center R1 on the inner wall surface 901.

The spring 18 is disposed between the pedal pad 15 and the inner wall surface 901 and partially accommodated in the space 110. The spring 18 is inserted into a through-hole 111 formed on the end surface 11 of the base portion 10. One end of the spring 18 is fixed to an end surface 152 of the pedal pad 15 facing the base portion 10. The other end of the spring 18 is fixed to the inner wall surface 901. The spring 18 urges the pedal pad 15 to move away from the inner wall surface 901.

The pad fixation portion 20 is disposed between the pedal pad 15 and the inner wall surface 901 and partially accommodated in the space 110. The pad fixation portion 20 includes a linkage member 21, a fixation force generation portion 22, a stroke detector 23, and a stroke limiting portion 24.

One end of the linkage member 21 is joined to the end surface 152 of the pedal pad 15. In the first embodiment, a part of the pedal pad 15 to which the linkage member 21 is fixed is farther from the rotatable support portion 16 than a part to which the spring 18 is fixed is from. The linkage member 21 is inserted into a through-hole 112 formed on the end surface 11 of the base portion 10. The other end of the linkage member 21 is inserted into the fixation force generation portion 22.

The fixation force generation portion 22 is a cylindrical member fixed to the inner wall surface 901. The fixation force generation portion 22 is formed such that the other end of the linkage member 21 can be inserted thereinto. The fixation force generation portion 22 has the same structure as a knock-type ballpoint pen configured to push out and fix the tip by pushing a button and to retract the tip by the next push of the button. That is, the pad fixation portion 20 is configured to mechanically fix the pedal pad 15 without electric signals.

In the first embodiment, when the linkage member 21 is inserted into the fixation force generation portion 22 by a predetermined length, the fixation force generation portion 22 fixes the linkage member 21 to be immovable relative to the fixation force generation portion 22. When the linkage member 21 is further pushed into the fixation force generation portion 22 while the linkage member 21 is immovable, the fixation force generation portion 22 unfixes the linkage member 21 to be movable. Effects of the fixation force generation portion 22 will be described later.

The stroke detector 23 is at an end of the fixation force generation portion 22 close to the pedal pad 15. The stroke detector 23 is configured to detect a length of the linkage member 21 inserted into the fixation force generation portion 22 as a stroke length. The stroke detector 23 is configured to output a signal indicative of the stroke length to the electrically connected ECU 28.

The stroke limiting portion 24 is on a side of the stroke detector 23 facing the pedal pad 15. The stroke limiting portion 24 is configured to restrict a length of the linkage member 21 inserted into the fixation force generation portion 22 based on an instruction from the ECU 28 electrically connected thereto. Details of the operation of the stroke limiting portion 24 will be described later.

The ECU 28 is configured to, based on the signal output from the stroke detector 23, calculate an angle θ of rotation of the pedal pad 15 which corresponds to the amount of the depression by the driver. The angle θ of rotation of the pedal pad 15 is an angle of rotation from an imaginary line A0 about a center R1. The ECU 28 is configured to instruct the stroke limiting portion 24 to restrict or not to restrict the length of the linkage member 21 inserted into the fixation force generation portion 22. The ECU 28 is configured to control a state of the vehicle based on: the calculated angle θ of rotation of the pedal pad 15; operations to a switch 29 for selecting a driving mode of the vehicle; and the driving mode of the vehicle on which the accelerator device 1 is mounted.

The angle θ of rotation of the pedal pad 15 according to the first embodiment will be described using the imaginary lines passing through the center R1 shown in FIG. 1.

When the pedal pad 15 overlaps the imaginary line A0 as shown in FIG. 1, the angle θ of rotation the pedal pad 15 is zero, and the accelerator is fully closed. Overlapping an imaginary line and the pedal pad 15 means overlapping a center line of the pedal pad 15 and the imaginary line in a side view of the accelerator device as shown in FIG. 1.

When the pedal pad 15 is depressed in the situation shown in FIG. 1, the pedal pad 15 rotates about the center R1 (as indicated by a solid arrow F11 in FIG. 1) and thus overlaps an imaginary line A1. At this situation, the angle θ of rotation of the pedal pad 15 is a first rotation angle θ1 that is a first operation amount, and the accelerator is fully opened. When operating the accelerator device 1 to control the opening degree of the throttle valve, the pedal pad 15 moves between the imaginary line A0 and the imaginary line A1.

Figure 2:
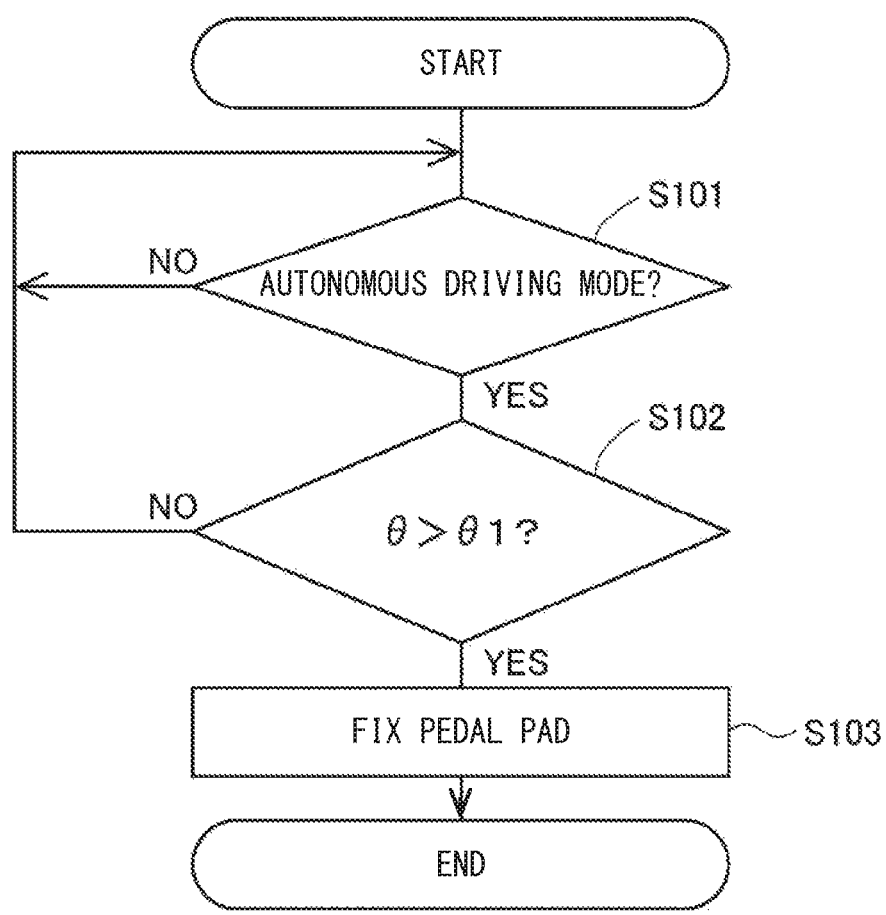
FIG. 2 is a flowchart of a process of fixing a pedal pad of the pedal device according to at least one embodiment.

Next, the actuation of the accelerator device 1 will be described with reference to FIGS. 2 to 5. FIG. 2 shows a flow of a process of fixing the pedal pad 15.

First, it is determined whether the driving mode of the vehicle on which the accelerator device 1 is mounted is an autonomous driving mode at step (hereinafter, simply referred to as "S") 101. The driving mode of the vehicle of the first embodiment is defined as follows.

The autonomous driving mode is a driving mode in which the operation to the accelerator device 1 is not required for driving the vehicle. The autonomous driving mode includes a cruise control that maintains the speed of the vehicle without operations to the accelerator. In the first embodiment, the driving mode includes, as well as the autonomous driving mode, a non-autonomous driving mode in which the operation to the accelerator device 1 is required for driving the vehicle.

The ECU 28 is configured to, based on the operation of the switch 29 by the driver, determine at S101 whether the driving mode of the vehicle on which the accelerator device 1 is mounted is the autonomous driving mode. When it is determined that the driving mode of the vehicle is the autonomous driving mode, the process proceeds to S102. When it is determined that the driving mode of the vehicle is not the autonomous driving mode, i.e. when it is determined that the driving mode of the vehicle is the non-autonomous driving mode, the determination of S101 is repeated.

When the driver depresses the pedal pad 15 while the driving mode of the vehicle is the non-autonomous driving mode, the pedal pad 15 rotates about the center R1. At this time, the linkage member 21 is inserted into the fixation force generation portion 22. The stroke detector 23 outputs a signal indicative of the stroke length of the linkage member 21 to the ECU 28. The ECU 28 calculates the angle θ of rotation of the pedal pad 15 based on the signal output from the stroke detector 23. The ECU 28 calculates the operation amount of the pedal pad 15 by the driver based on the angle θ of rotation of the pedal pad 15, and controls the opening degree of the throttle valve. In the first embodiment, these operations are performed when the position of the pedal pad 15 is between the imaginary line A0 and the imaginary line A1.

When it is determined that the driving mode of the vehicle is the autonomous driving mode at S101, the ECU 28 outputs an instruction to the stroke limiting portion 24 not to restrict the length of the linkage member 21 inserted into the fixation force generation portion 22. As a result, the length of the linkage member 21 inserted into the fixation force generation portion 22 can be freely changed according to the degree of the depression of the pedal pad 15 by the driver.

In contrast, when it is determined that the driving mode of the vehicle is not the autonomous driving mode at S101, the ECU 28 outputs an instruction to the stroke limiting portion 24 to restrict the length of the linkage member 21 inserted into the fixation force generation portion 22. As a result, the length of the linkage member 21 inserted into the fixation force generation portion 22 is restricted. Accordingly, the angle $\theta$ of rotation of the pedal pad 15 is limited to the first rotation angle $\theta 1$.

Next, the ECU 28 determines at S102 whether the calculated angle $\theta$ of rotation of the pedal pad 15 is larger than the first rotation angle $\theta 1$.

Figure 3:
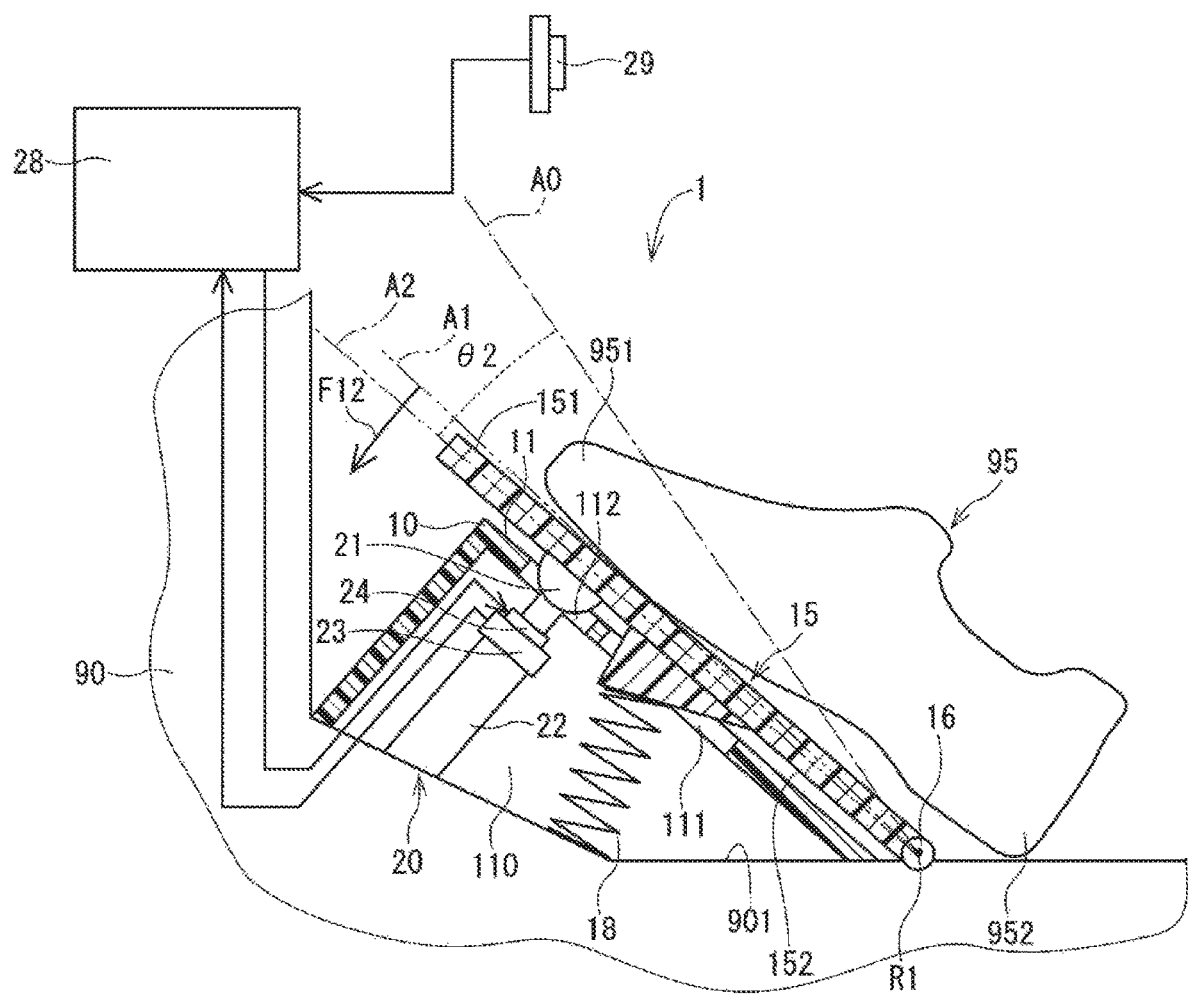
FIG. 3 is a schematic diagram illustrating the pedal device according to at least one embodiment in a state where the pedal pad is fixed.

When the pedal pad 15 situated between the imaginary line A0 and the imaginary line A1 is further depressed, the pedal pad 15 can approach the base portion 10 over the imaginary line A1 as shown in FIG. 3 since the length of the linkage member 21 inserted into the fixation force generation portion 22 is not restricted by the stroke limiting portion 24. At this time, the angle $\theta$ of rotation of the pedal pad 15 is larger than the first rotation angle $\theta 1$. The ECU 28 determines whether the angle $\theta$ of rotation of the pedal pad 15 is larger than the first rotation angle $\theta 1$ based on the signal output from the stroke detector 23. When it is determined that the angle $\theta$ of rotation of the pedal pad 15 is larger than the first rotation angle $\theta 1$, the process proceeds to S103. When it is determined that the angle $\theta$ of rotation of the pedal pad 15 equal to or smaller than the first rotation angle $\theta 1$, the process returns to S101.

Next, the pedal pad 15 is fixed at S103. The pedal pad 15 situated as shown in FIG. 3 is fixed by a fixation force generated by the fixation force generation portion 22 against the urging force of the spring 18, and the pedal pad 15 overlaps an imaginary line A2. The angle $\theta$ of rotation of the pedal pad 15 at this time is a second rotation angle $\theta 2$ that is a second operation amount. The second rotation angle $\theta 2$ is larger than the first rotation angle $\theta 1$.

Figure 4:
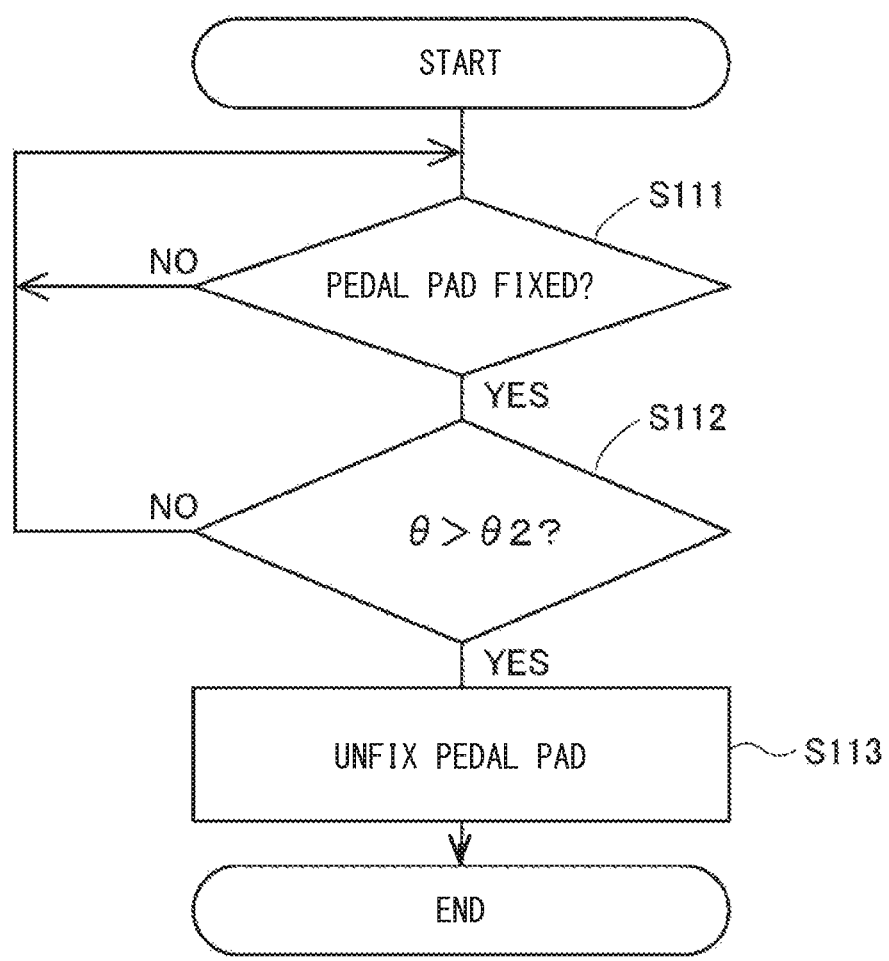
FIG. 4 is a flowchart of a process of unfixing the pedal pad of the pedal device according to at least one embodiment.

Next, a method of unfixing the pedal pad 15 will be described. FIG. 4 shows a flow of a process of unfixing the pedal pad 15.

First, the ECU 28 determines at S111 whether the pedal pad 15 is fixed based on a change of the calculated angle $\theta$ of rotation of the pedal pad 15. When it is determined that the pedal pad 15 is fixed, the process proceeds to S112. When it is determined that the pedal pad 15 is not fixed, the determination at S111 is repeated.

Figure 5:
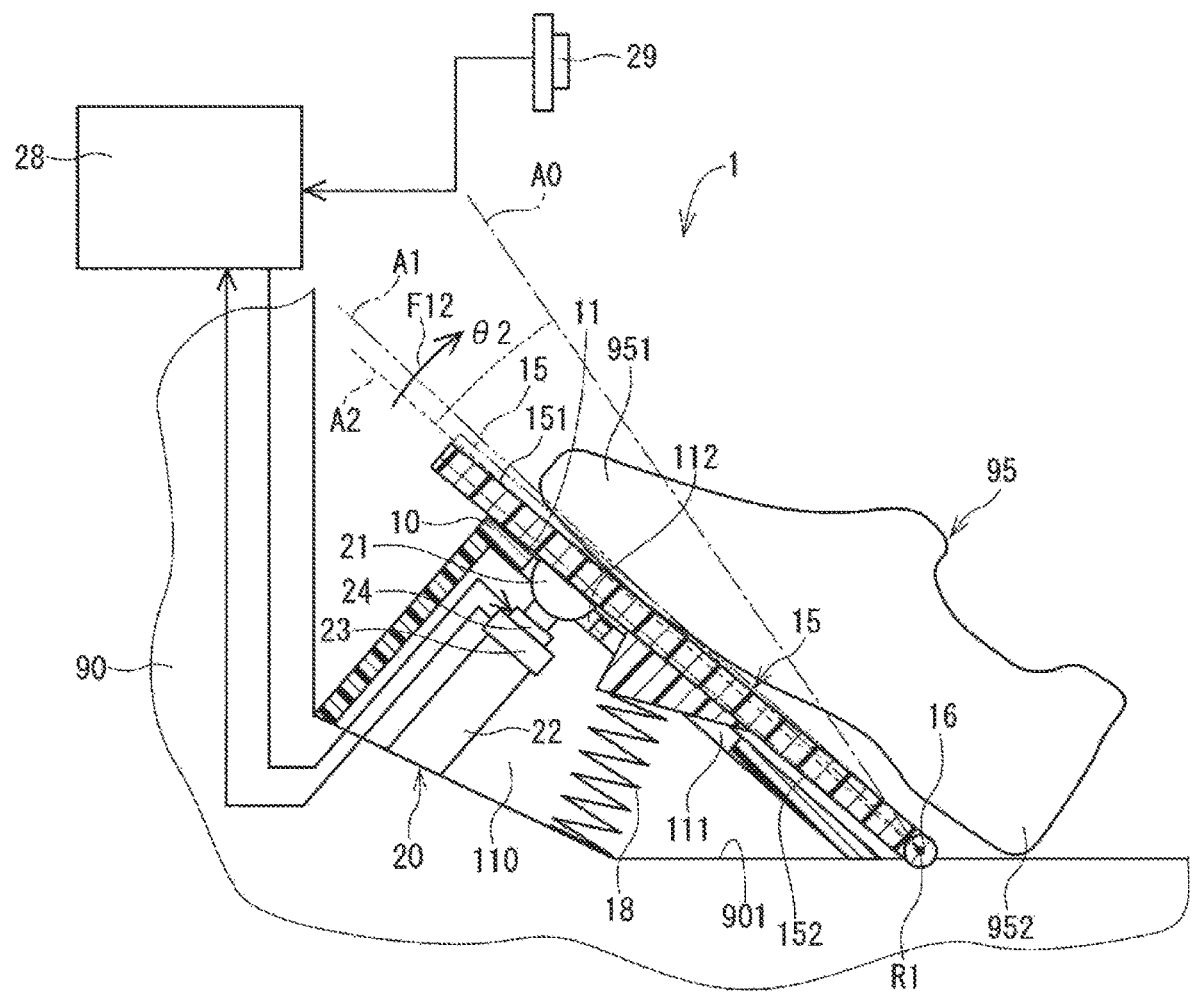
FIG. 5 is a schematic diagram illustrating the pedal device according to at least one embodiment in a state where the pedal pad is not fixed.

Next, the ECU 28 determines at S112 whether the calculated angle $\theta$ of rotation of the pedal pad 15 is larger than the second rotation angle $\theta 2$. FIG. 5 shows a state of the accelerator device 1 when it is determined at S112 that the angle $\theta$ of rotation of the pedal pad 15 is larger than the second rotation angle $\theta 2$. In FIG. 5, the position of the pedal pad 15 shown in FIG. 3 is indicated by dot-dot-dash line 15.

When depressing the pedal pad 15 in the state shown in FIG. 3, the pedal pad 15 approaches the base portion 10 as compared to the state shown in FIG. 3 indicated by the dot-dot-dash line (for example, the pedal pad 15 approaches the base portion 10 over the imaginary line A2 as shown in FIG. 5). At this time, the angle $\theta$ of rotation of the pedal pad 15 is larger than the second rotation angle $\theta 2$. The ECU 28 determines whether the angle $\theta$ of rotation of the pedal pad 15 is larger than the second rotation angle $\theta 2$ based on the signal output from the stroke detector 23. When it is determined that the angle $\theta$ of rotation of the pedal pad 15 is larger than the second rotation angle $\theta 2$, the process proceeds to S113. When it is determined that the angle $\theta$ of rotation of the pedal pad 15 equal to or smaller than the second rotation angle $\theta 2$, the process returns to S111.

Next, the pedal pad 15 is unfixed at S113. As a result, the pedal pad 15 that has been fixed by the fixation force generation portion 22 can move relative to the base portion 10 (as indicated by a solid arrow F12 in FIG. 5).

When the pedal pad 15 is unfixed, the change of the angle $\theta$ of rotation of the pedal pad 15 can be detected based on the signal output from the stroke detector 23. When the ECU 28 detects the change of the angle $\theta$ of rotation of the pedal pad 15, the ECU 28 switches the driving mode from the autonomous driving mode to the non-autonomous driving mode. The ECU 28 outputs an instruction to the stroke limiting portion 24 to restrict the length of the linkage member 21 inserted into the fixation force generation portion 22. Accordingly, the angle $\theta$ of rotation of the pedal pad 15 is limited to the first rotation angle $\theta 1$.

(a) In the accelerator device 1 of the first embodiment, the pedal pad 15 can be fixed by the pad fixation portion 20 so as not to move relative to the base portion 10. Accordingly, when the driving mode of the vehicle on which the accelerator device 1 is mounted is the autonomous driving mode, the driver can rest the foot 95 on the pedal pad 15 fixed by the pad fixation portion 20. Accordingly, since the accelerator device 1 is configured such that the driver can rest the foot during the autonomous driving mode in which the driver is not required to operate the accelerator device 1, fatigue of the driver's foot can be reduced.

(b) According to the accelerator device 1, the pedal pad 15 is unfixed by depressing the pedal pad 15 such that the angle $\theta$ of rotation of the pedal pad 15 is larger than the second rotation angle $\theta 2$, and thereby the driving mode of the vehicle on which the accelerator device 1 is mounted is switched from the autonomous driving mode to the non-autonomous driving mode such that the accelerator device 1 can be operated. According to the accelerator device 1, the autonomous driving mode can be quickly switched to the non-autonomous driving mode.

(c) In the accelerator device 1 of the first embodiment, the pedal pad 15 can be mechanically fixed. Accordingly, the pedal pad 15 can be fixed and unfixed with a structure at a relatively low cost.

(d) According to the accelerator device 1 of the first embodiment, the pedal pad 15 is fixed when the angle $\theta$ of rotation of the pedal pad 15 is larger than the first rotation angle $\theta 1$. Accordingly, the pedal pad 15 can be fixed by operating only the pedal pad 15 during the autonomous driving mode. Accordingly, the pedal pad 15 of the accelerator device 1 can be fixed easily.

(e) According to the accelerator device 1 of the first embodiment, the pedal pad 15 is unfixed when the angle $\theta$ of rotation of the pedal pad 15 is larger than the second rotation angle $\theta 2$. Accordingly, the pedal pad 15 can be unfixed by operating only the pedal pad 15 during the autonomous driving mode. Accordingly, the pedal pad 15 of the accelerator device 1 can be unfixed easily.

(f) According to the accelerator device 1 of the first embodiment, when the driving mode of the vehicle is not the autonomous driving mode, the stroke limiting portion 24 restricts the length of the linkage member 21 inserted into the fixation force generation portion 22 based on the instruction from the ECU 28. Accordingly, the angle $\theta$ of rotation of the pedal pad 15 does not become larger than the first rotation angle θ1 while the driving mode of the vehicle is not the autonomous driving mode. Accordingly, when the driving mode of the vehicle is not the autonomous driving mode, unintentional fixation of the pedal pad 15 can be prevented.

Second Embodiment

Next, a pedal device according to a second embodiment will be described with reference to FIGS. 6 to 10. In the second embodiment, the structure of the pad fixation portion is different from that of the first embodiment. In the following discussion, substantially identical portions, which are substantially identical to those of the first embodiment, will be indicated by the same reference signs and will not be described redundantly.

An accelerator device 2 of the second embodiment includes the base portion 10, the pedal pad 15, the spring 18, the pad fixation portion 30, and the ECU 28.

The pad fixation portion 30 is disposed between the pedal pad 15 and the inner wall surface 901 and partially accommodated in the space 110. The pad fixation portion 30 includes a linkage member 31, an electric actuator 32, and the stroke detector 23.

The linkage member 31 has an arc shape of an imaginary circle whose center is the center R1. The linkage member 31 has multiple teeth on an outside in a radial direction of the imaginary circle. One end of the linkage member 31 is joined to the end surface 152 of the pedal pad 15. In the second embodiment, a part of the pedal pad 15 to which the linkage member 31 is fixed is farther from the rotatable support portion 16 than a part to which the spring 18 is fixed is from. The other end of the linkage member 31 is inserted into the stroke detector 23 located in the space 110.

Figure 6:
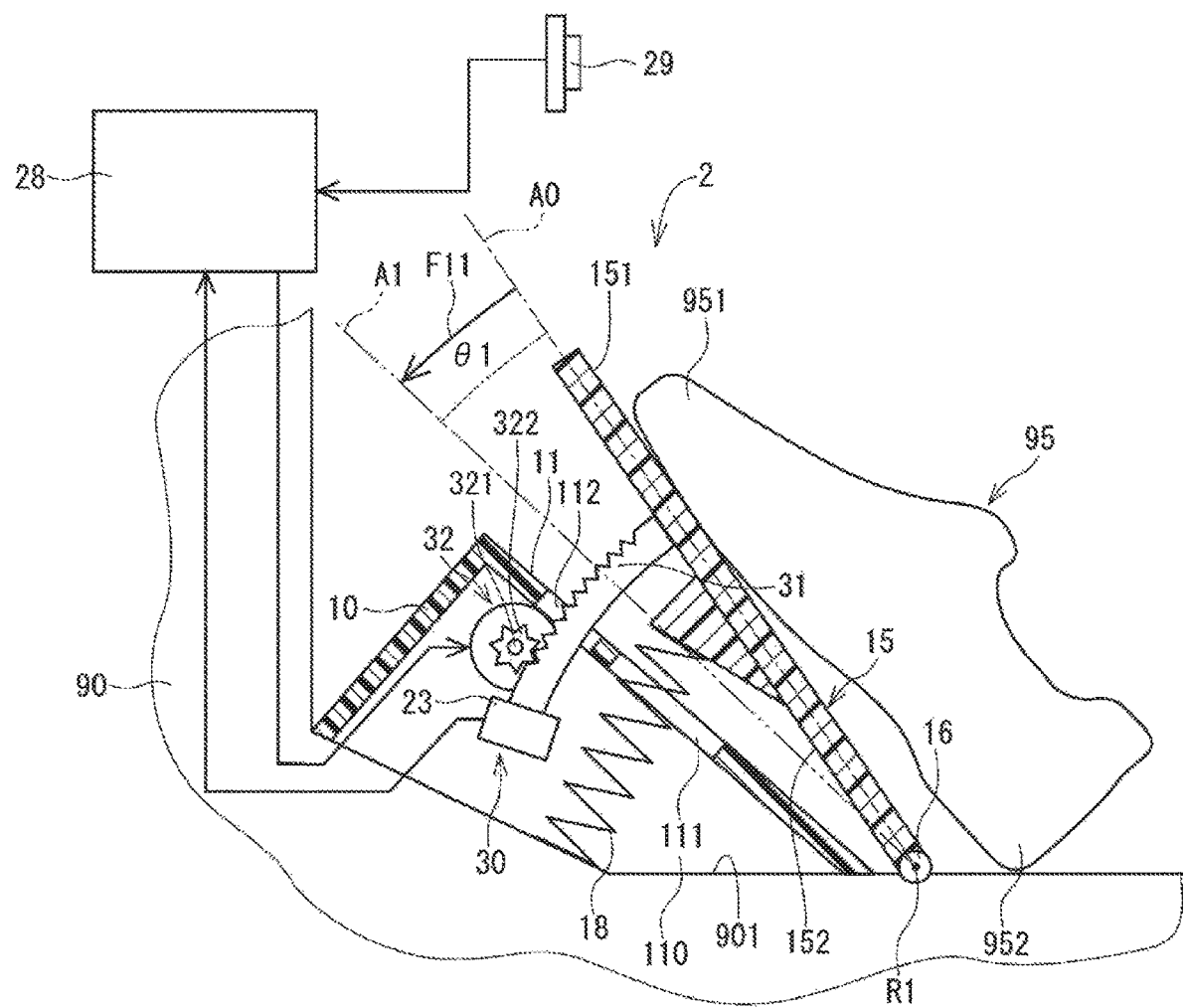
FIG. 6 is a schematic diagram illustrating a pedal device according to at least one embodiment.

The electric actuator 32 is accommodated in the space 110 and electrically connected to the ECU 28. The actuation of the electric actuator 32 is controlled by the ECU 28. The electric actuator 32 has a rotation shaft 321 and a gear 322. The gear 322 is integrally rotatable with the rotation shaft 321. The teeth of the gear 322 engage with the teeth of the linkage member 31 as shown in FIG. 6.

Figure 7:
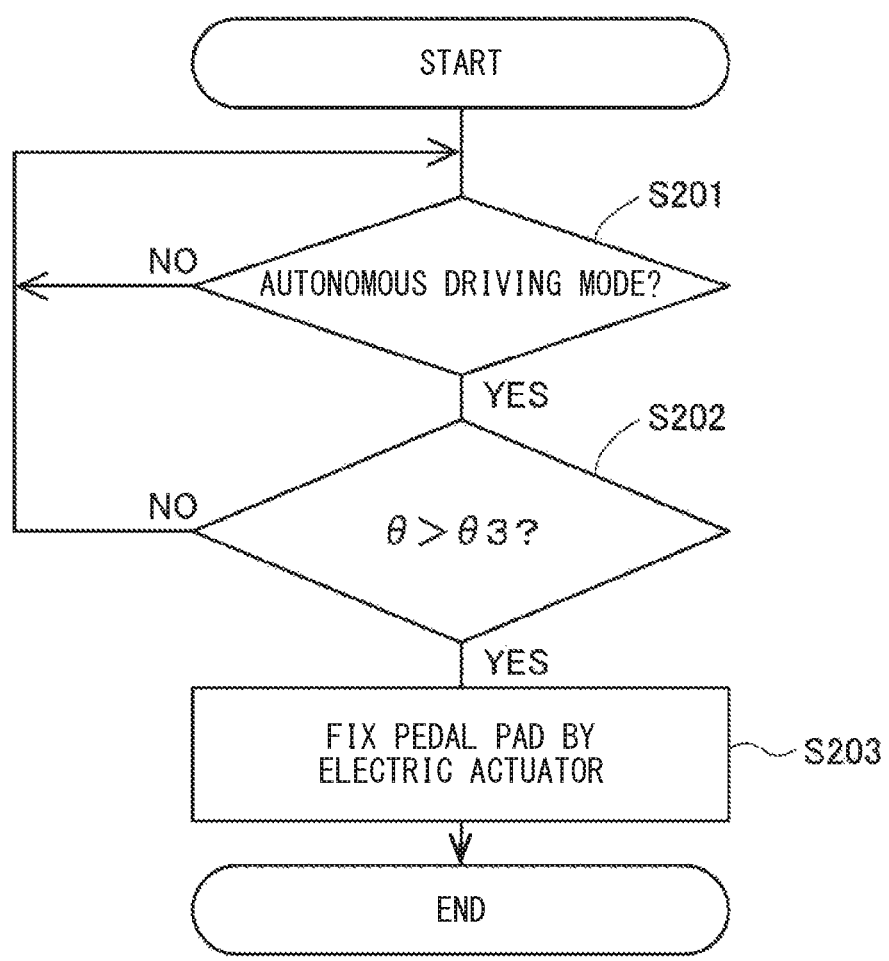
FIG. 7 is a flowchart of a process of fixing a pedal pad of the pedal device according to at least one embodiment.

Next, the actuation of the accelerator device 2 will be described with reference to FIGS. 7 to 10. FIG. 7 shows a flow of a process of fixing the pedal pad 15.

First, it is determined whether the driving mode of the vehicle on which the accelerator device 2 is mounted is an autonomous driving mode at S201 as in S101 of the first embodiment.

Next, the ECU 28 determines at S202 whether the calculated angle θ of rotation of the pedal pad 15 is larger than a third rotation angle θ3.

Figure 8:
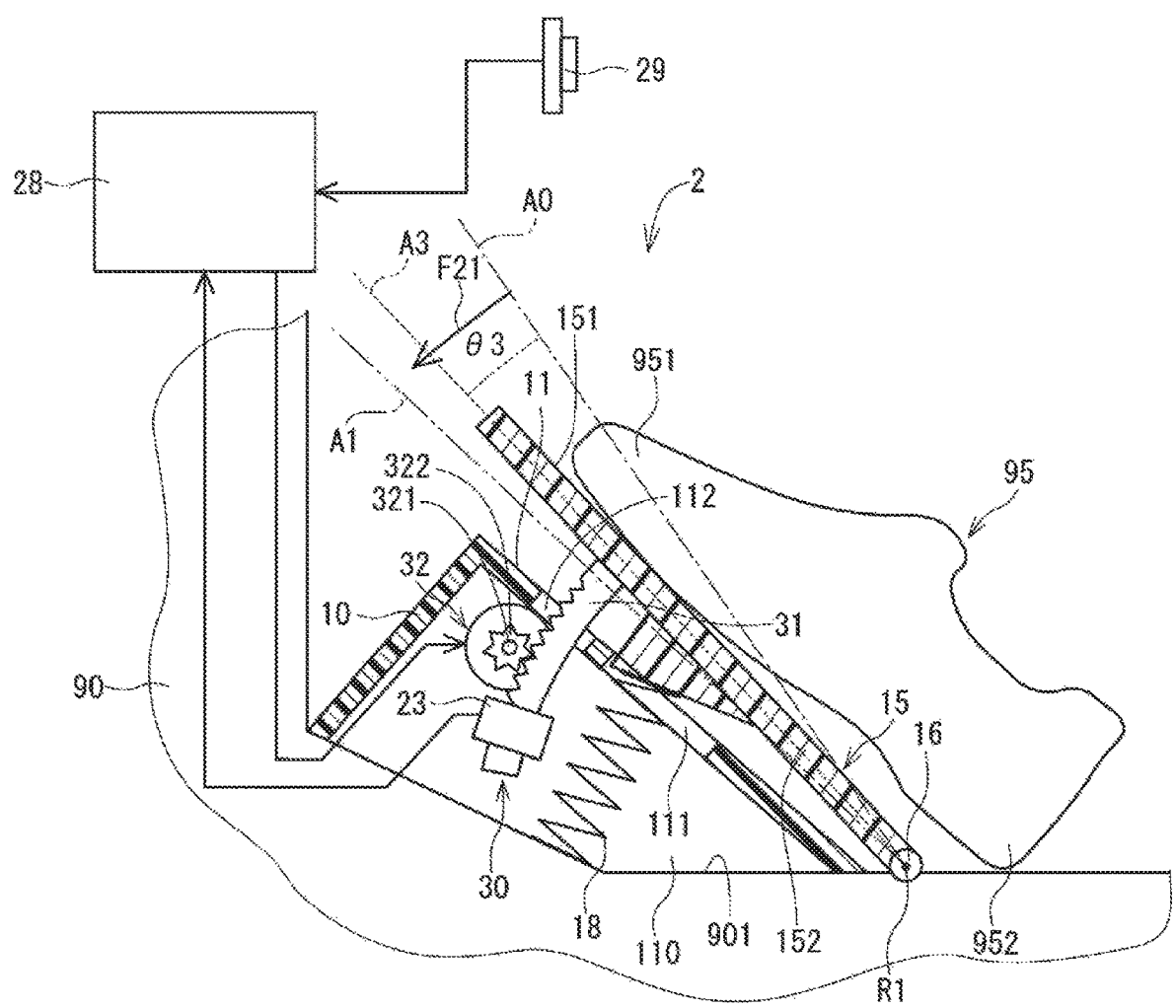
FIG. 8 is a schematic diagram illustrating the pedal device according to at least one embodiment in a state where the pedal pad is fixed.

The third rotation angle θ3 will be described with reference to FIG. 8. FIG. 8 shows the accelerator device 2 in which the angle θ of rotation of the pedal pad 15 is at the third rotation angle θ3.

The third rotation angle θ3 is smaller than the first rotation angle θ1 of the first embodiment and can be set variably. When the angle θ of rotation of the pedal pad 15 is the third rotation angle θ3, the pedal pad 15 overlaps an imaginary line A3 located between the imaginary line A0 and the imaginary line A1 as shown in FIG. 8. Specifically, at S201 and S202, the driver depresses the pedal pad 15 overlapping the imaginary line A0 over the imaginary line A3 after pressing the switch 29 to switch the driving mode to the autonomous driving mode (as indicated by a solid arrow F21 in FIG. 8).

The ECU 28 determines at S202 whether the angle θ of rotation of the pedal pad 15 is larger than the third rotation angle θ3 based on the signal output from the stroke detector 23. When it is determined that the angle θ of rotation of the pedal pad 15 is larger than the third rotation angle θ3, the process proceeds to S203. When it is determined that the angle θ of rotation of the pedal pad 15 equal to or smaller than the third rotation angle θ3, the process returns to S201.

Next, the electric actuator 32 fixes the pedal pad 15 at S203. The ECU 28 locks the electric actuator 32 at S203 such that the rotation shaft 321 does not rotate. Since the teeth of the linkage member 31 is engaged with the teeth of the gear 322, the linkage member 31 is immovable due to the fixing force of the electric actuator 32. Accordingly, the pedal pad 15 joined to the linkage member 31 is fixed at a position under the imaginary line A3.

Figure 9:
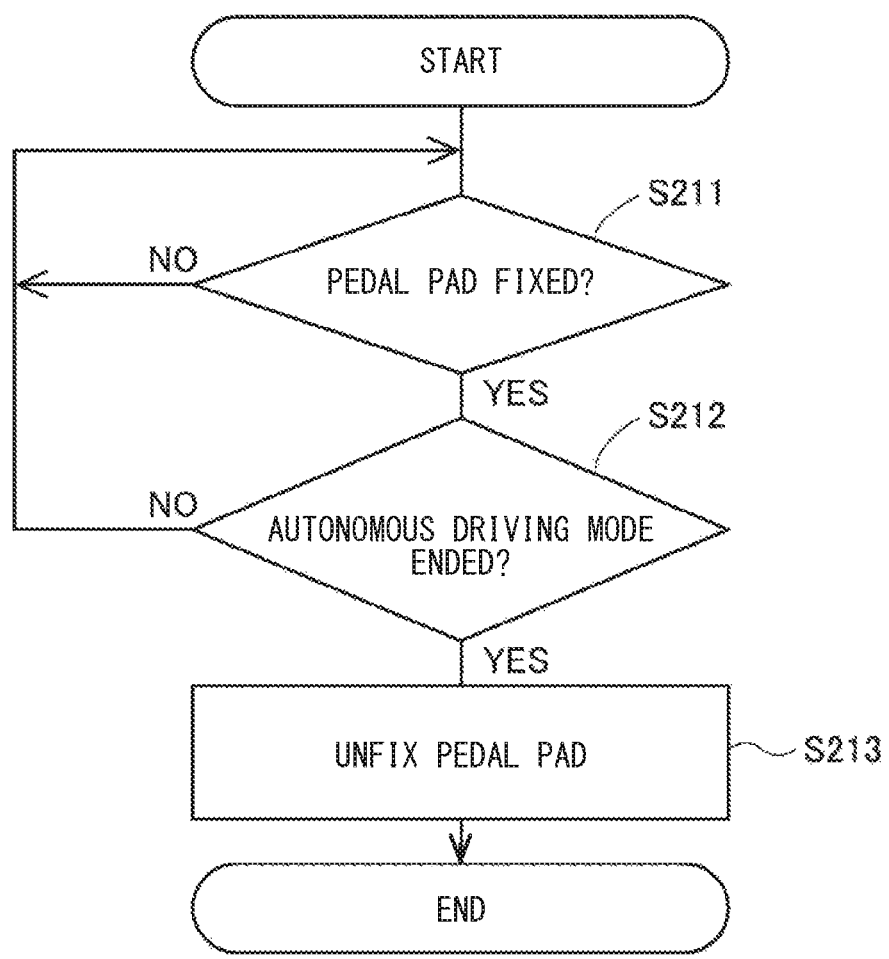
FIG. 9 is a flowchart of a process of unfixing the pedal pad of the pedal device according to at least one embodiment.
Figure 10:
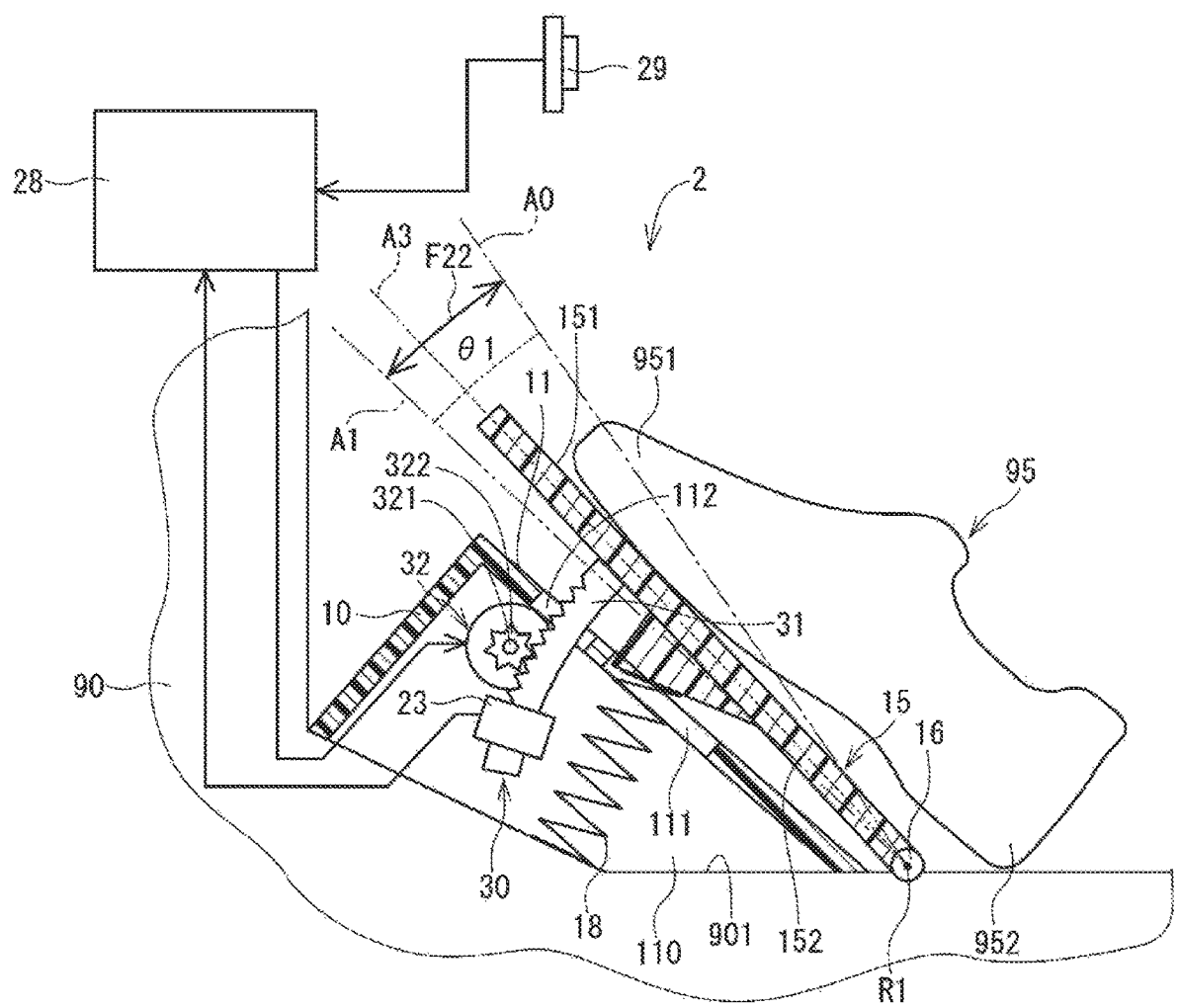
FIG. 10 is a schematic diagram illustrating the pedal device according to at least one embodiment in a state where the pedal pad is not fixed.

Next, a method of unfixing the pedal pad 15 will be described. FIG. 9 shows a flow of a process of unfixing the pedal pad 15.

First, it is determined at S211 whether the pedal pad 15 is fixed as in S111 of the first embodiment. When it is determined that the pedal pad 15 is fixed, the process proceeds to S212. When it is determined that the pedal pad 15 is not fixed, the determination at S211 is repeated.

Next, the ECU 28 determines at S212 whether the autonomous driving mode is ended. Specifically, the ECU 28 determines whether the driver switched the driving mode with the switch 29. When it is determined that the autonomous driving mode is ended, the process proceeds to S213. When it is determined that the autonomous driving mode is not ended, the determination at S211 is repeated.

Next, the pedal pad 15 is unfixed at S213. That is, the electric actuator 32 locked based on the instruction from the ECU 28 is unlocked. Accordingly, since the rotation shaft 321 becomes rotatable, the linkage member 31 becomes movable, and the pedal pad 15 becomes movable relative to the base portion 10 (as indicated by a solid arrow F22 in FIG. 10).

In the accelerator device 2 of the second embodiment, the pedal pad 15 can be fixed by the pad fixation portion 30 so as not to move relative to the base portion 10. Thus, the second embodiment has the effects (a), (b), (d) and (e) of the first embodiment.

In the accelerator device 2, the electric actuator 32 generating the fixing force for fixing the pedal pad 15 is controlled by the ECU 28. Accordingly, the accelerator device 2 can fix the pedal pad 15 at any rotation angle. Since the pedal pad 15 can be fixed at an angle optimum for the driver, fatigue of the driver can be further reduced.

In the accelerator device 2, the autonomous driving mode can be ended by operating the switch 29, so that the pedal pad 15 can be operated. Accordingly, a motion of the pedal pad 15 relative to the base portion 10 due to unintentional operation by the driver can be prevented. Further, the pedal pad 15 can be unfixed by an operation with a hand of the driver that can move relatively quickly. Accordingly, the state of the pedal pad 15 can be quickly switched to the state where the pedal pad 15 can be operated.

Third Embodiment

Figure 11:
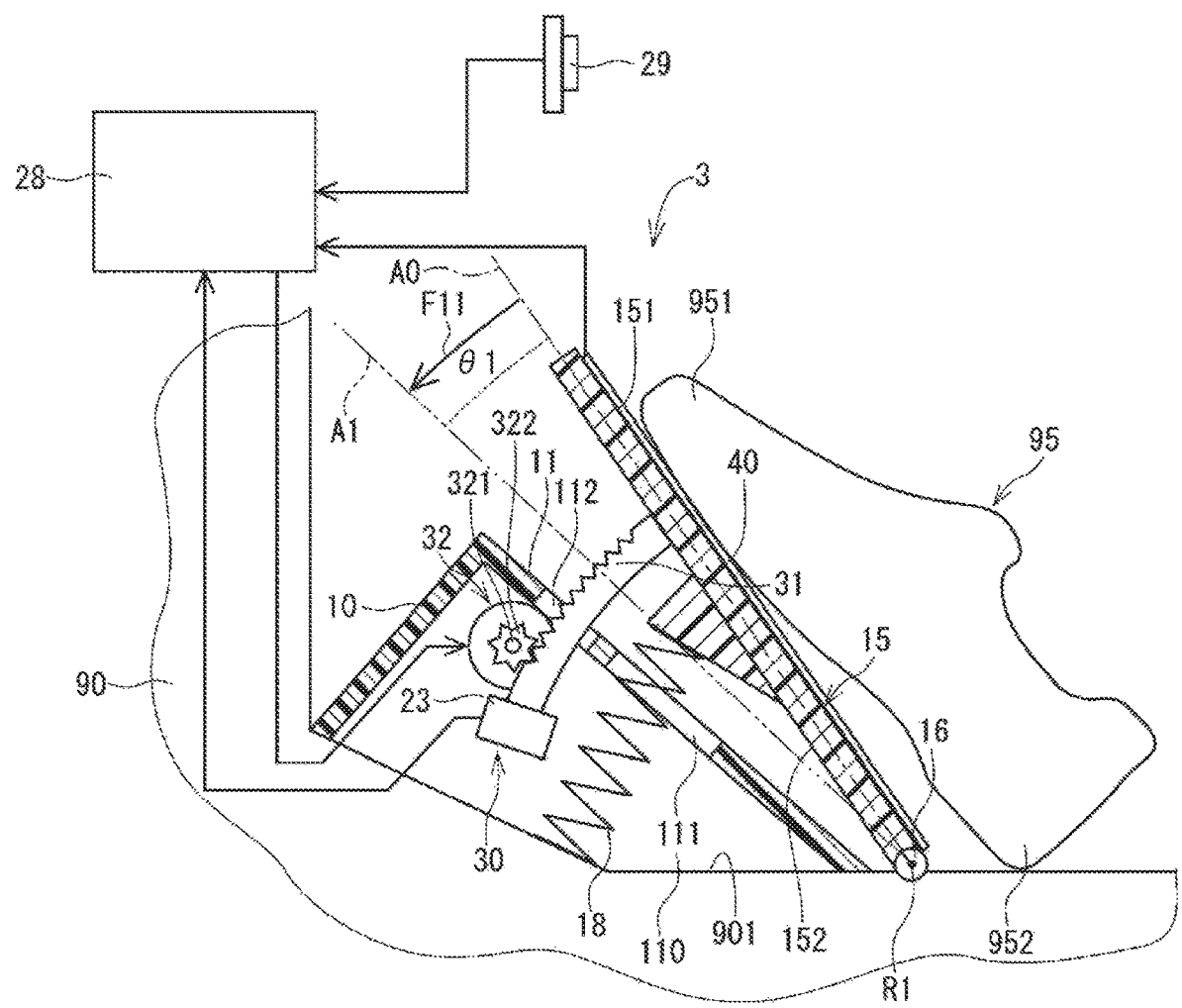
FIG. 11 is a schematic diagram illustrating a pedal device according to at least one embodiment.

Next, a pedal device according to a third embodiment will be described with reference to FIG. 11. The third embodiment is different from the second embodiment in that the pedal pad includes a contact detector. In the following discussion, substantially identical portions, which are substantially identical to those of the second embodiment, will be indicated by the same reference signs and will not be described redundantly.

An accelerator device 3 of the third embodiment includes the base portion 10, the pedal pad 15, the spring 18, the pad fixation portion 30, a pressure sensor 40 that is the contact detector, and the ECU 28.

The pressure sensor 40 is provided on the end surface 151 of the pedal pad 15. The pressure sensor 40 is a capacitive switch, for example, and electrically connected with the ECU 28. The pressure sensor 40 is configured to output a signal indicating that the foot 95 is rested when the foot 95 is rested thereon.

According to the accelerator device 3, the ECU 28 is configured to determine whether the foot 95 is rested on the pressure sensor 40 in a process of unfixing the pedal pad 15. When the foot 95 is rested on the pressure sensor 40, the ECU 28 unfixes the pedal pad 15 based on a combination of the signal output from the pressure sensor 40 and the signal for ending the autonomous driving mode from the switch 29 operated by the driver.

In contrast, when the foot 95 is not rested on the pressure sensor 40, the ECU 28 is configured not to unfix the pedal pad 15 only based on the signal for ending the autonomous driving mode from the switch 29. In this case, the ECU 28 is configured to unfix the pedal pad 15 based on the signal output from the pressure sensor 40 and indicating that the foot 95 is rested on the pressure sensor 40.

In the accelerator device 3 of the third embodiment, the pedal pad 15 can be fixed by the pad fixation portion 30 having the electric actuator 32 so as not to move relative to the base portion 10. In this way, the third embodiment achieves the advantages that are the same as those of the second embodiment.

According to the accelerator device 3, the ECU 28 is configured to unfix the pedal pad 15 based on the signal from the pressure sensor 40 and the signal from the switch 29 operated by the driver for ending the autonomous driving mode. Accordingly, even when the switch 29 is unintentionally operated, the autonomous driving mode is not ended when the driver is not ready to operate the accelerator device 3, i.e. when the foot 95 is not rested on the pressure sensor 40. Accordingly, the autonomous driving mode is not ended by an unintentional operation.

Other Embodiments

In the above embodiment, the "pedal device" is an accelerator device for controlling the driving of the throttle valve of the vehicle. However, the field to which the "pedal device" of the present disclosure is applied is not limited to this field. For example, it may be applied to the operation of a brake or a clutch, and it can be applied to a field where various driving is controlled depending on the depression amount by the operator who operates the pedal device.

In the above-described embodiments, the structure for fixing the linkage member of the fixation force generation portion is the same as the structure of the knock-type ballpoint pen for pushing out and retracting the tip. However, the structure for fixing the linkage member of the fixation force generation portion is not limited to this. For example, the structure may be the same as the structure of a foot-operated type parking brake for locking and unlocking.

In the first embodiment, the first rotation angle $\theta 1$ is the rotation angle of the pedal pad at which the accelerator device is fully opened. However, the first rotation angle $\theta 1$ is not limited to this. The first rotation angle $\theta 1$ may be a rotation angle larger than the rotation angle at which the accelerator device is fully opened.

In the first embodiment, the stroke limiting portion is provided for restricting the length of the linkage member inserted into the fixation force generation portion when the driving mode of the vehicle is not the autonomous driving mode. However, the stroke limiting portion may be omitted.

In the second embodiment, the ECU is configured to lock the electric actuator to fix the pedal pad when it is determined that the rotation angle of the pedal pad is larger than the third rotation angle $\theta 3$. However, the rotation angle of the pedal pad at which the ECU locks the electric actuator is not limited to this.

For example, a desired rotation angle of the pedal pad for reducing fatigue of the driver may be preliminarily stored in the ECU in addition to the angle larger than the third rotation angle $\theta 3$ at which the electric actuator is locked. The ECU may be configured to drive the electric actuator such that the rotation angle of the pedal pad becomes the desired rotation angle when the rotation angle of the pedal pad is larger than the third rotation angle $\theta 3$. According to this, fatigue of the driver can be further reduced.

In the second embodiment, the third rotation angle is smaller than the first rotation angle $\theta 1$. However, the third rotation angle $\theta 3$ is not limited to this. The third rotation angle $\theta 3$ may be larger than the first rotation angle $\theta 1$. In the second embodiment, the third rotation angle $\theta 3$ can be set adequately.

In the third embodiment, the ECU is configured to end the autonomous driving mode based on the combination of the signal output from the pressure sensor and the signal output from the switch. However, the method of ending the autonomous driving mode in the third embodiment is not limited to this. The autonomous driving mode may be ended only based on the signal output from the pressure sensor. This is because the driver is ready to operate the accelerator device when the pressure sensor outputs the signal indicating that the foot is rested on the pressure sensor.

The pressure sensor of the third embodiment may be applied to the first embodiment.

The present disclosure should not be limited to the embodiments described above, and various other embodiments may be implemented without departing from the scope of the present disclosure.

The present disclosure has been described based on the embodiments. However, the present disclosure is not limited to the embodiments and structures. The present disclosure also encompasses various modifications and variations within the scope of equivalents. Furthermore, various combination and formation, and other combination and formation including one, more than one or less than one element may be made in the present disclosure.

What is claimed is:
1. A pedal device comprising:
a base;
a pedal pad movable relative to the base; and
a pad fixation portion configured to fix the pedal pad to be immovable in any direction of a range of movement of the pedal pad relative to the base so that the pedal pad is fixed at a fixed position in response to an operation of the pedal pad and remains fixed at the fixed position upon non-operation of pedal pad.
2. The pedal device according to claim 1, wherein the pad fixation portion includes an electric actuator.
3. The pedal device according to claim 2, wherein the pad fixation portion is configured to fix the pedal pad after a driving mode of a vehicle on which the pedal device is mounted is switched from a non-autonomous driving mode to an autonomous driving mode.

4. The pedal device according to claim 2, wherein
the pad fixation portion is configured to fix the pedal pad in response to an operation amount of the pedal pad, and
the operation amount of the pedal pad for fixing the pedal pad is variably settable.

5. The pedal device according to claim 2, wherein
the pad fixation portion is configured to fix the pedal pad by a fixing force of the electric actuator.

6. The pedal device according to claim 1, wherein
the pad fixation portion is a mechanical pad fixation portion.

7. The pedal device according to claim 6, wherein
the pad fixation portion is configured to fix the pedal pad when the pedal pad is operated by an operation amount larger than a first predetermined operation amount.

8. The pedal device according to claim 7, wherein
a second predetermined operation amount is larger than the first predetermined operation amount,
the pad fixation portion is configured to unfix the pedal pad when the pedal pad is operated by an operation amount larger than the second predetermined operation amount.

9. The pedal device according to claim 1, further comprising:
a contact detector disposed on the pedal pad and configured to detect a contact of a foot of an operator.

10. The pedal device according to claim 1, wherein:
the pad fixation portion is configured to fix the pedal pad when the pedal pad is operated by an operation amount larger than a first predetermined operation amount; and
the operation amount is an angle of rotation of the pedal pad and the first predetermined operation amount is a first predetermined rotation angle.

* * * * *